(12) United States Patent
Kitao

(10) Patent No.: US 6,835,136 B2
(45) Date of Patent: Dec. 28, 2004

(54) GAME SYSTEM, COMPUTER READABLE STORAGE MEDIUM STORING GAME PROGRAM AND IMAGE DISPLAYING METHOD

(75) Inventor: Takashi Kitao, Tokyo (JP)

(73) Assignee: Konami Computer Entertainment Japan, Inc., Tokyo (JP)

(*) Notice: Subject to any disclaimer, the term of this patent is extended or adjusted under 35 U.S.C. 154(b) by 393 days.

(21) Appl. No.: 09/815,571

(22) Filed: Mar. 23, 2001

(65) Prior Publication Data

US 2001/0024972 A1 Sep. 27, 2001

(30) Foreign Application Priority Data

Mar. 24, 2000 (JP) ........................................ 2000-088606

(51) Int. Cl.[7] .................................................. A63F 9/24
(52) U.S. Cl. ............................................ 463/33; 463/43
(58) Field of Search .............................. 463/1, 30, 31, 463/32, 33, 34, 36, 37, 38, 43

(56) References Cited

U.S. PATENT DOCUMENTS

| | | | | |
|---|---|---|---|---|
| 5,993,318 A | * | 11/1999 | Kousaki | 463/35 |
| 6,126,545 A | * | 10/2000 | Takahashi et al. | 463/32 |
| 6,409,596 B1 | * | 6/2002 | Hayashida et al. | 463/31 |

FOREIGN PATENT DOCUMENTS

| | | |
|---|---|---|
| EP | 0841640 | 5/1998 |
| EP | 0893149 | 1/1999 |
| EP | 0933105 | 8/1999 |
| EP | 0952555 | 10/1999 |
| JP | 11-007543 | 1/1999 |
| JP | 11007543 | 1/1999 |

* cited by examiner

Primary Examiner—Nguyen Kim
(74) Attorney, Agent, or Firm—Jordan and Hamburg LLP

(57) ABSTRACT

Game system in which an object is arranged in a virtual three-dimensional space including a display device, an input device for outputting signals according to player operations and a game control device for executing a game according to a program while checking the output of the input device and displaying a visual field image including the object on the display device. The visual field image is viewed from a predetermined view point position in the virtual three-dimensional space. The game control device includes a position determining device for determining whether to view the object from a first view point position which is a back and slightly inclined position toward a moving direction of the object to view an observation position set forward the object, or from a second view point position from which the observation point is viewed in a fixed direction regardless of the movement of the object.

9 Claims, 8 Drawing Sheets

GAME SYSTEM, COMPUTER READABLE STORAGE MEDIUM STORING GAME PROGRAM AND IMAGE DISPLAYING METHOD

BACKGROUND OF THE INVENTION

1. Field of the Invention

The present invention relates to a a game system for displaying an image of an object moving in a virtual three-dimensional space.

2. Description of the Related Art

Recently, a game system which performs three-dimensional processing for a game picture has become common. For example, such as a shooting game, a game with a full of presence can be provided by displaying a three-dimensional situation in which an encountered opponent character is attacked.

In such a game system, a view point position and an observation paint, as standards for a display range, are settled in accordance with the situation as adz display object for a character or a various kind of constitution arranged at a predetermined coordinate position respectively on a game field settled in a virtual three-dimensional space.

Thus, a player can operate the character while watching a picture as if captured by a virtual camera which moves around freely in a three-dimensional game field.

However, for example such as in a shooting game, a character as an operation object generally moves very rapidly. Furthermore, the character changes its position intensely at a battle scene against an opponent character. Therefore, a problem which makes the player uncomfortable occurs, because a display picture in the three-dimensional space turns around rapidly when the player watches a specific observation point while following the movement of the character as an operation object by the above mentioned virtual camera to enhance the reality of the game.

SUMMARY OF THE INVENTION

It is therefore an object of the present invention to provide a game system capable of solving the above mentioned problem. The game system is capable for displaying a game picture which makes the player feel presence and does not give the player an uncomfortable feeling when an operation object moving freely on the game field in the three-dimensional space is displayed.

Now, the present invention will be described.

According to the first embodiment of this invention, there is provided a game system arranging an object in a virtual three-dimensional space and displaying a visual field image on a game screen viewing the object from a predetermined view point position. In the game system, a plurality of view point positions are arranged in the virtual three-dimensional space, the view point position is selectively switched in accordance with a state of the object, and a visual field image is displayed on a game screen viewing the object from view point positions moving from one position to another when the view point position is switched.

According to another aspect of the first embodiment of this invention, there is provided a computer readable recording medium including a program for allowing a computer, included in a game system arranging an object in a virtual game space and displaying a visual field image on a game screen viewing an object from a predetermined view point position, to function so as to switch the view point position selectively in accordance with a state of the object by setting a plurality of view point positions in the virtual three-dimensional space, and to display the visual field image on the game screen viewing the object from view point positions moving from one position to another when the view point position is switched.

According to another aspect of the first embodiment of this invention, there is provided an image displaying method arranging an object in a virtual three-dimensional space and displaying a visual field image on a game screen viewing the object from a predetermined view point position. A plurality of view point positions are set or determined in the virtual three-dimensional space, the view point position is selectively switched in accordance with a state of the object, and a visual field image viewing the object from view point positions moving from one position to another is displayed on the screen.

According to these aspects of the first embodiment of the invention, an object in the virtual three-dimensional space is displayed on the game screen and the view point position is switched one after another in accordance with the state change of the object position. The view point position moves smoothly while displaying the object when the position is switched. Accordingly, the player can watch a picture from the most appropriate position in accordance with the game progress. Further, the player does not feel uncomfortable, resulting in a comfortable three-dimensional game with full of presence.

According to the second embodiment of this invention, there is provided a game system displaying an image on the game screen captured by a virtual camera from a predetermined view point position to an object moving in a virtual three-dimensional space in accordance with a player's operation, wherein the game system comprises a view point position setting device for setting a first view point position from which a predetermined observation point is viewed while following a movement of an operation object, and a second view point position from which the operation object is viewed in a predetermined fixed direction, and a virtual camera setting device for arranging the virtual camera by switching alternatively the first view point position to the second view point position corresponding to a state of the operation object and for moving the virtual camera along a virtual line connecting the first view point position with the second view point position while keeping a state of capturing the operation object when the view point position is switched.

According to another aspect of the second embodiment of this invention, there is provided a computer readable storage medium including a program for allowing a computer constituting a game system, the game system displaying a picture captured by a virtual camera from a predetermined view point position to an object moving in accordance with a player's operation in a virtual three-dimensional space, to function as, a view point position setting device for setting a first view point position to view a predetermined observation point following a movement of an operation object and a second view point position to fixedly view the operation object in a predetermined direction, and a virtual camera setting device for arranging the virtual camera by switching the first view point position alternatively to the second view point position corresponding to a state of the operation object, and for moving the virtual camera along a virtual line connecting the first view point position to the second view point position while keeping a state of capturing the operation object when the view point position is switched.

According to another aspect of the second embodiment of this invention, there is provided an image displaying method displaying a visual field image viewed from a predetermined view point position by a virtual camera toward an object moving in accordance with a player's operation in a virtual three-dimensional space, comprising, a view point position setting device for setting a first view point position for viewing a predetermined observation point by following a movement of an operation object, and a second view point position for fixedly viewing the operation object in a predetermined direction, and a virtual camera setting device for arranging the virtual camera by alternatively switching the first view point position to the second view point position in accordance with a state of the operation object, and moving the virtual camera along a line connecting the first view point position with the second view point position while keeping a state of capturing the operation object when the view point position is switched.

According to these aspects of the second embodiment of the invention, if the player operates the object so as to move it in the three-dimensional space during watching the game screen, the virtual camera is shifted between the first and the second view point position as occasion demands in accordance with the state of the position change and the like of the object. At the same time, the view point position is moving smoothly with capturing the object. Accordingly, the player can watch the picture selectively from subjective view point or objective view point based on the object corresponding to the progress of the game. Further, as the player does not feel uncomfortable by rapid change of an image at the view point change, a three-dimensional game which is comfortable and with which the player can catch the state of the game at once can be realized According to the third embodiment of this invention, there is provided a game system displaying an image on a game screen captured from a predetermined view point position with a virtual camera wherein a first object operated by a player and a second object having a relation with the first object move in a virtual three-dimensional space. The game system includes a view point position setting device for setting a first view point position to view a predetermined observation point following the moving first object and for setting a second view point position viewed based on an observation point settled between both objects when the first object has a relation to the second object, a distance judging device for judging a distance between the first object and the second object, and a virtual camera setting device for arranging the virtual camera by switching the first view point position alternatively to the second view point position corresponding to a judgement result by the distance judging device.

According to another aspect of the third embodiment of this invention, there is provided a computer readable storage medium including a program for allowing a computer constituting a game system, the game system displaying an image on a game screen captured from a predetermined view point position with a virtual camera wherein a first object operated by a player and a second object having a relation with the first object move in a virtual three-dimensional space, to function as, a view point position setting device for setting a first view point position to view a predetermined observation point following the moving first object and for setting a second view point position viewed based on an observation point settled between both characters when the first object has a relation to the second object, a distance judging device for judging a distance between the first object and the second object, and a virtual camera setting device for arranging the virtual camera by switching the first view point position alternatively to the second view point position corresponding to a judgement result by the distance judging device.

According to another aspect of the third embodiment of this invention, there is provided an image displaying method displaying an image on a game screen captured from a predetermined view point position with a virtual camera wherein a first object operated by a player and a second object having a relation with the first object move in a virtual three-dimensional space. A view point position setting device is provided for setting a first view point position to view a predetermined observation point following the moving first object and for setting a second view point position viewed based on a observation point settled between both objects when the first object has a relation to the second object. A distance judging device is provided for judging a distance between the first object and the second object, and a virtual camera setting device is provided for arranging the virtual camera by switching the first view point position alternatively to the second view point position corresponding to a judgement result by the distance judging device.

According to these aspects of the third embodiment of this invention, if the player operates the first object so as to move it in the three-dimensional space during watching the game screen, the virtual camera is located at the subjective view point of the first object at the fist stage of the game. However the view point is switched to the objective view point viewing both characters from a predetermined direction when the second object appears and approaches the position where some relation between them occurs. For example, as a case where the first object has a relation to the second object, in the shooting game, there is a case where the player operates his or her own character as the first object and comes into a battle against the opponent character as the second object. Accordingly, a three-dimensional game is realized in such a manner where the player can feel an empathy with the first object by watching a picture of subjective view point during the movement of the first object, while he or she can gasp the battle situation instantly by watching a picture of objective view point in the shooting game.

According to another embodiment of this invention, there is provided a game system in which the virtual camera setting device moves the virtual camera along a virtual line connecting the first view point position with the second view point position while keeping the state in which the first object and the second object are captured during the view point position is switched.

According to another embodiment of this invention, there is provided a computer readable storage medium recording a game program in which the virtual camera setting device moves said virtual camera along a virtual line connecting said first view point position to said second view point position while keeping a state in which said first object and said second object are captured when the view point position is switched.

According to above two embodiments of this invention, in the case where the view point position of the virtual camera is switched when the first object and the second object have relation with each other for example, the virtual camera moves on the virtual line smoothly and captures and displays the state of the relation between two objects on the game screen during the movement. Therefore, the player can gasp properly the situation of the relation between the first object and the second object for example, even if the view point position changes during the game proceeds, resulting in realizing a suitable three-dimensional displaying especially for the shooting game.

According to another embodiment of this invention, there is provided a game system in which the virtual camera setting device adjusts a moving speed when the virtual camera is moved along the virtual line in accordance with a distance judged by the distance judging device.

According to another embodiment of this invention, there is provided a computer readable storage medium recording a game program in which the virtual camera setting device adjusts a moving speed of the virtual camera when the camera moves along the virtual line in accordance with a distance judged by the distance judging device.

According to above two embodiments of this invention, in the case where the view point position of the virtual camera is switched when the first object and the second object have relation with each other for example, it is properly adjusted whether virtual camera is moved along the virtual line in a high speed or a low speed. Accordingly, the camera is moved quickly if the movement of two object relation is rapid or the camera is moved in low speed if the both object moves slowly. Thus the movement of the view point which accords with a situation and a three-dimensional game with better visibility are realized.

According to another embodiment of this invention, there is provided a game system in which the virtual camera setting device arranges a position of the virtual camera so that the position is switched to the first view point position when a distance judged by the distance judging device is smaller than a predetermined settled value, and the position is switched to the second view point position when the distance is within a predetermined settled value.

According to another embodiment of this invention, there is provided a computer readable storage medium recording a game program, in which the virtual camera setting device arranges the virtual camera at the first view point position when a distance judged by the distance judgement device is larger than a predetermined settled value and at the second view point position when the distance is within a predetermined settled value.

According to these above two embodiments of this invention, the distance between the first object and second object is watched in the virtual three-dimensional space, and the virtual camera is set so as to make a subjective view point image of the first object when both objects keep a distance and to make an objective view point image from a predetermined direction when both objects are in a short distance.

Thus a three-dimensional game with a good visibility is realized and the view point position of the virtual camera is easily switched.

According to another embodiment of this invention, there is provided a game system in which the view point position setting device adjusts a distance between the second view point position and the observation point so that the distance is within a distance judged by the distance judging device.

According to another embodiment of this invention, there is provided a computer readable storage medium recording a game program, in which the view point position setting device adjusts a distance between the second view point position and the observation point so that the first object and the second object are arranged within a capture range.

According to these above two embodiments of this invention, the second view point position where the virtual camera is set is adjusted by moving it backward and forward so that both objects do not go outside of the capture range when the first object and the second object keep a distance away from each other during the battle. Accordingly, in the case of the battle situation of the shooting game, for example, a powerful game picture can be displayed by taking a dynamic picture following the movement of the character.

DESCRIPTION OF THE PREFERRED EMBODIMENTS

Figure 1:
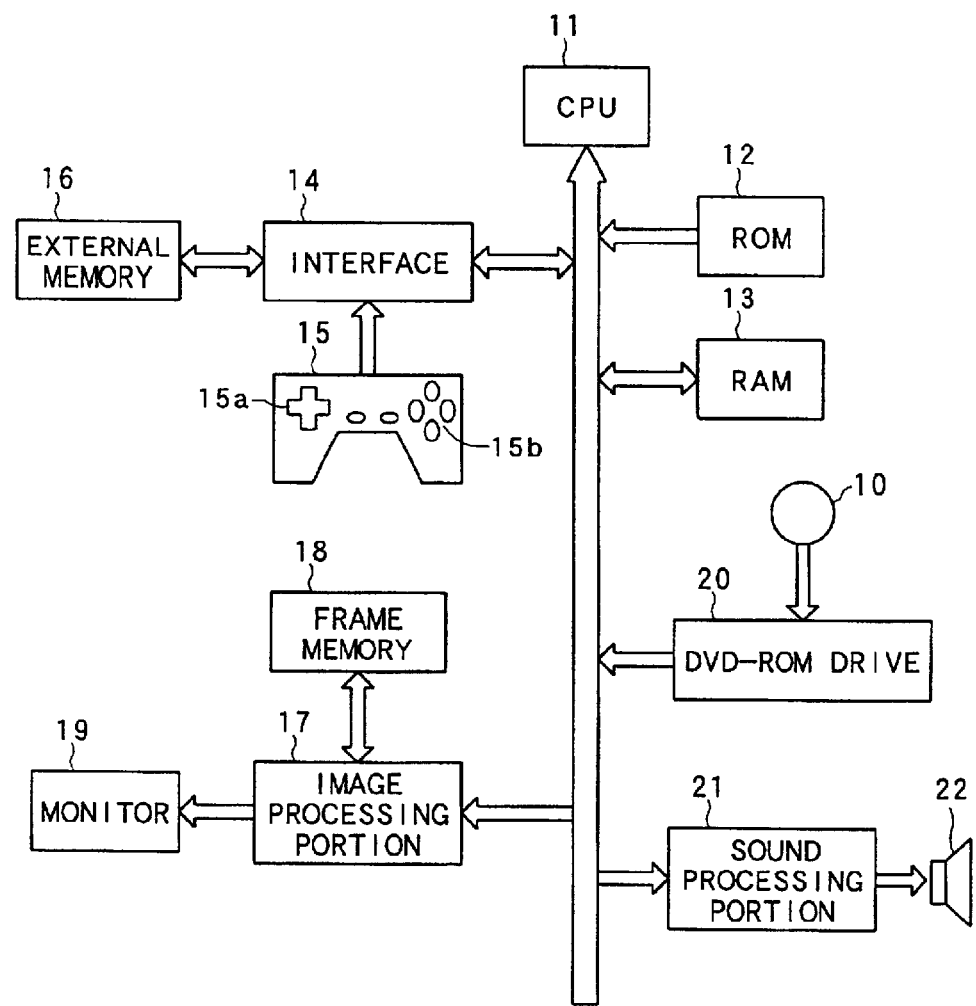
FIG. 1 is a block diagram of brief constitution of the game system according to one embodiment of the present invention.

FIG. 1 is a block diagram of the game system according to one embodiment of the present invention. The game system shown in FIG. 1 is includes a CPU 11, ROM 12, RAM 13, interface 14, controller 15, external memory 16, image processing portion 17, flame memory 18, monitor 19, DVD-ROM drive 20, sound processing portion 21, and speaker 22. The required game is executed by setting DVD-ROM 10 recorded a game program and data in the DVD-ROM drive 20.

In FIG. 1, the CPU 11 controls the operation of the whole game system and is connected to each constitutional component for communicating control signals and data. ROM 12 and ROM 13 are used as recording means, and programs and various kind of data of operating system required for controlling the operation of the whole game system are stored in ROM 12. A recording area is provided in RAM 13 for temporarily storing programs and data or data required for the proceeding of the game read out from DVD-ROM 10.

The controller 15 connected via interface 14 functions as an operation means or an input device which the player operates during the game process. There are provided in the controller 15 operation members such as a cross-shaped key 15a for inputting upward and downward directions and push bottom key 15b. A signal is transmitted to CPU 11 in accordance with the operation state of these operation members. An external memory 16 is connected permanently to an interface 14 or in a manner such that it is detachable from the interface 14, and used so that the data which indicates the game progress is recorded in a rewriteable manner. The player can record desired data in external memory 16 by providing instructions using the controller 15 as required during the game.

The DVD-ROM 10 is a storage medium storing the program performing the game and various data such as image data and sound data attached to the game. The DVD-ROM drive 20 reads the necessary program and data by the reading out operation to the DVD-ROM 10 under the control of CPU 11. The image processing portion 17 performs an image processing for the image data read out from DVD-ROM 10 and processed by CPU 11. The frame memory 18 keeps an image data corresponding to the game picture of each frame pictured by the image processing portion 17. On the monitor 19, image data is transformed and output as video signal from the frame memory 18 in a predetermined interval under the control of the CPU 11.

The sound processing portion 21 transforms the sound data read out from DVD-ROM 10 to an analog sound data and outputs it from the speaker 22. Further, the sound processing portion 22 generates effect sound and music data required for the game, transforms it to analog signal and output it from speaker 22.

Still, a home-use television set and auxiliary speaker are used as monitor 19 and speaker 22.

Now, the outline of the game picture of the game system for this embodiment will be explained referring to FIGS. 2 to 5. Here an example of the shooting game in which the player competes the score by operating the character on the game picture and attacking the appeared enemy will be explained.

Figure 2:
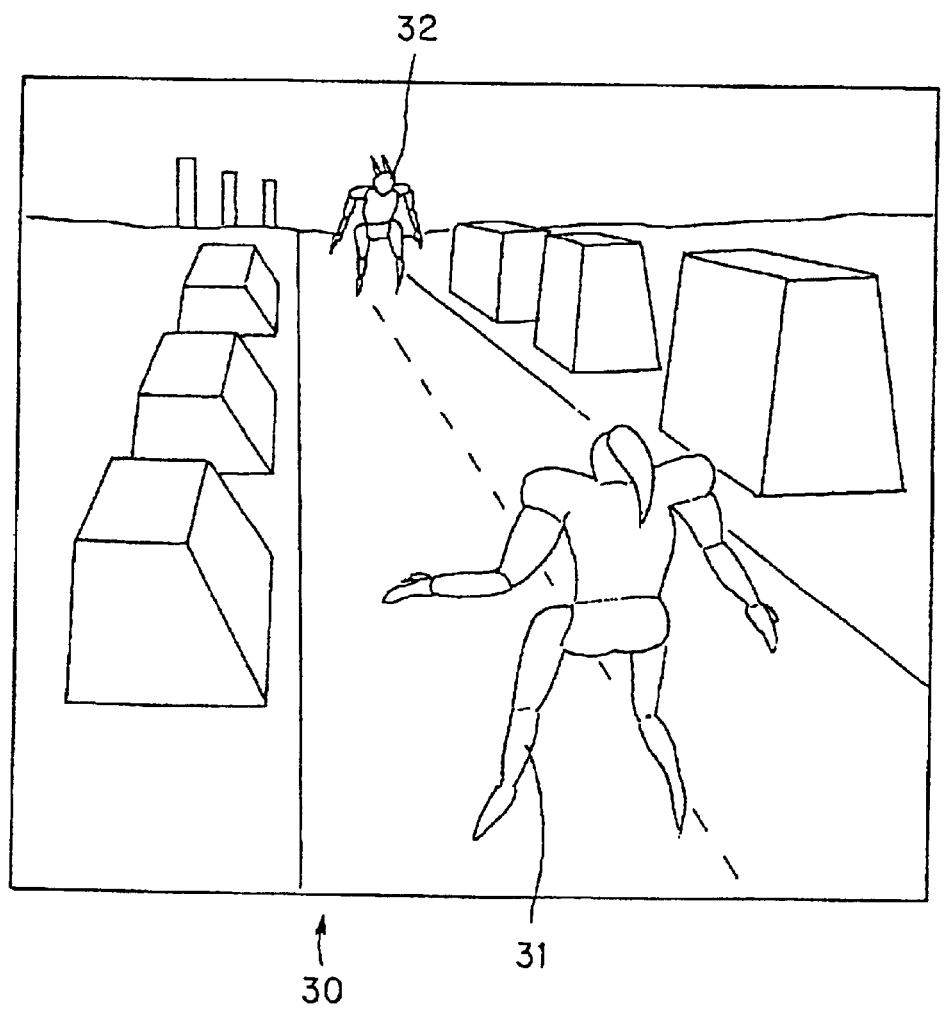
FIG. 2 shows a game picture displayed on the screen during the game, showing the case when it is viewed from the first view point position.

FIG. 2 shows a diagram indicating an example of game picture 30 to be displayed on the monitor 19 during the game. As shown in FIG. 2, an image viewed from a predetermined view point position in a game field as a virtual three-dimensional space is displayed. In this game picture 30, the player's own character 31 as the player's operation first object, the opponent character 32 as the second object to be attacked, and a various kind of the structure such as buildings are displayed. In the background, ground and sky are illustrated.

The player can control the movement of the player's own character 31 by operating the controller 15 while watching game picture 30. For example, the player's own character 31 may be moved in the optional direction corresponding to the operation direction of the cross-shaped key 15 as moving operation of the player's own character 31. Or, when the opponent character is discovered, an aiming setting of equipped weapons or firing may be performed by pushing down the predetermined push bottom 15b as an attacking operation.

In FIG. 2, the player's own character 31 arranged in the game field, the opponent character 32, and other objects such as the structures are modeled by many polygons respectively. Each polygon is represented by a polygon defined by a plurality of vertex coordinates and an aggregation of these polygons constitutes each object. When an object is arranged on the game picture 30, the three-dimensional expression of each object is realized by making a coordinate transformation for each polygon, by setting each position, and by pasting the texture as an image data on the polygon.

Figure 3:
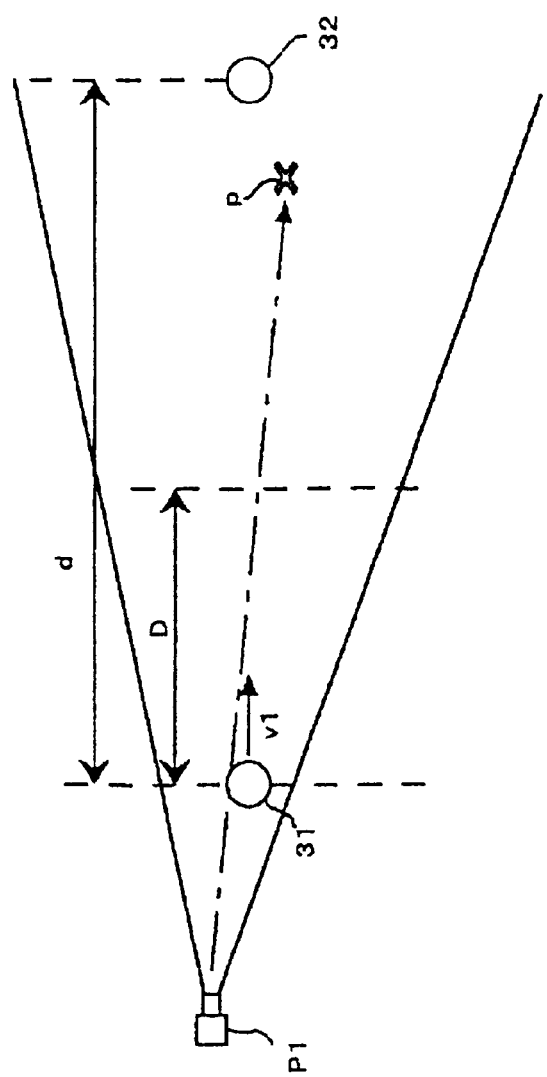
FIG. 3 shows the game picture in FIG. 2 viewed from upper side, a reproduction of visual field picture viewed from the first view point position.

Next, the first view point position P1 settled at the game picture 30 in FIG. 2 will be explained referring to FIG. 3. FIG. 3 is a diagram viewing the game picture 30 in FIG. 2 from the above position and illustrates a visual field image watching from the first view point position P1.

In FIG. 3, the first view point position is set at backside and slightly inclined toward the moving direction of the player's own character 31. Moreover, as understood in FIG. 2, the altitude of the first view point position P1 is settled at around the head of the player's own character 31. Further, the first view point position P1 moves in the game field so as to keep the relative position relation with the player's own character 31. Namely, as shown in FIG. 3, if the player's own character 31 moves in the direction indicated by an arrow at a speed of v1, then the first view point position P1 moves toward the same direction in a same speed of v1.

In FIG. 3, the visual field watched from the first view point position P1 faces the observation point P settled at the front side of the moving direction of the player's own character 31. Moreover, the visual field range watched from the first view point position P1 is determined corresponding to the predetermined visual field angle of which center is the observation point P. Accordingly, objects existing in the visual field range including the player's own character 31 and the opponent character are displayed on the game picture 30 based on the first view point position P1.

In this embodiment, it is assumed to set the second view point position P2 (FIG. 5), which will be explained later, in addition to the first view point position P1 and to move the virtual camera from one view point to another picturing the game picture 30. The condition to set the virtual camera at the first view point position P1 is determined based on the distance between the player's own character 31 and the opponent character 32. Accordingly, as described in FIG. 3, when the distance d between the player's own character 31 and the opponent character 32 is more than predetermined value D, then the virtual camera is set at the first view point position P1. By displaying a picture captured by the virtual camera set at the first view point position P1 on the game screen 30 as such manner mentioned above, a view as a three-dimensional picture watched from the player's own character 31 can almost be covered and the player can watch a subjective picture with which the player can easily feel.

On the other hand, when the player's own character 31 moves so that the distance d to the opponent character 32 becomes within the predetermined value D, the position of the virtual camera is switched to the second view point position P2 as explained later. Still, concrete switching method for switch the virtual camera from the first view point position P1 to the second view point position P2 will be explained later.

Although in FIG. 3, the case where the game screen 30 is viewed from upper side was explained, the captured picture by the first view point position P1 is considered with a same concept as the case in FIG. 3 even if the case is such that the game picture 30 of FIG. 30 is viewed from the side.

Figure 4:
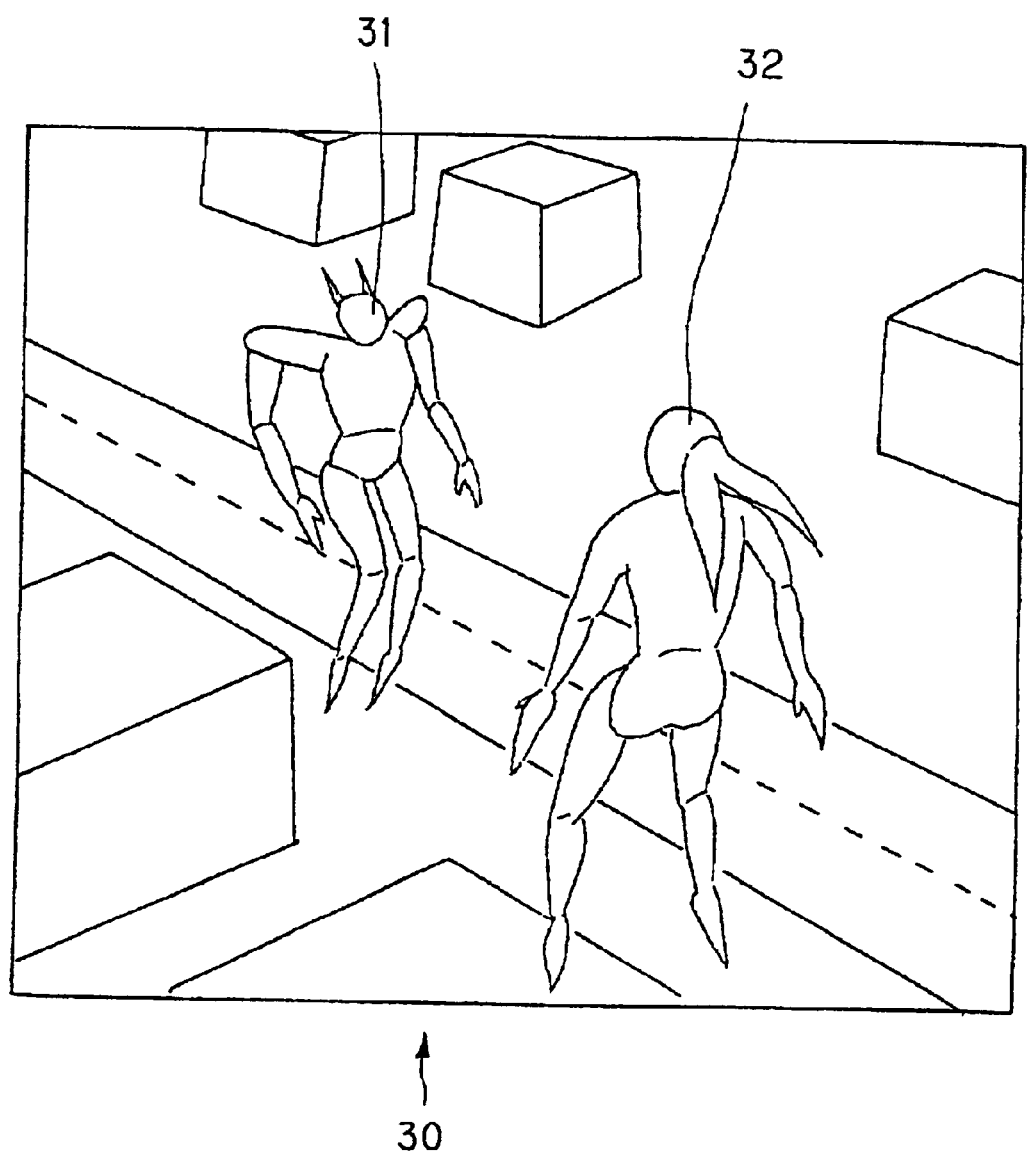
FIG. 4 shows a game picture displayed on the screen during the game, showing the case when it is viewed from the second view point position.

Next, FIG. 4 shows an example that an image viewed from the second view point position P2 is displayed as the game picture 30 displayed on the monitor 19 during the game. In the game picture 30 shown in FIG. 4, images of the player's own character 31 and the opponent character 32 battling in the game field viewed from the aslant and side view point are displayed. In FIG. 4, the constitution method of each object by polygon and the operation by the controller 115 are common to that of FIG. 2. However, it is desired that the many variations such as attacking operation are provided because the player's own character 31 and the opponent character 32 are battling in FIG. 4.

Figure 5:
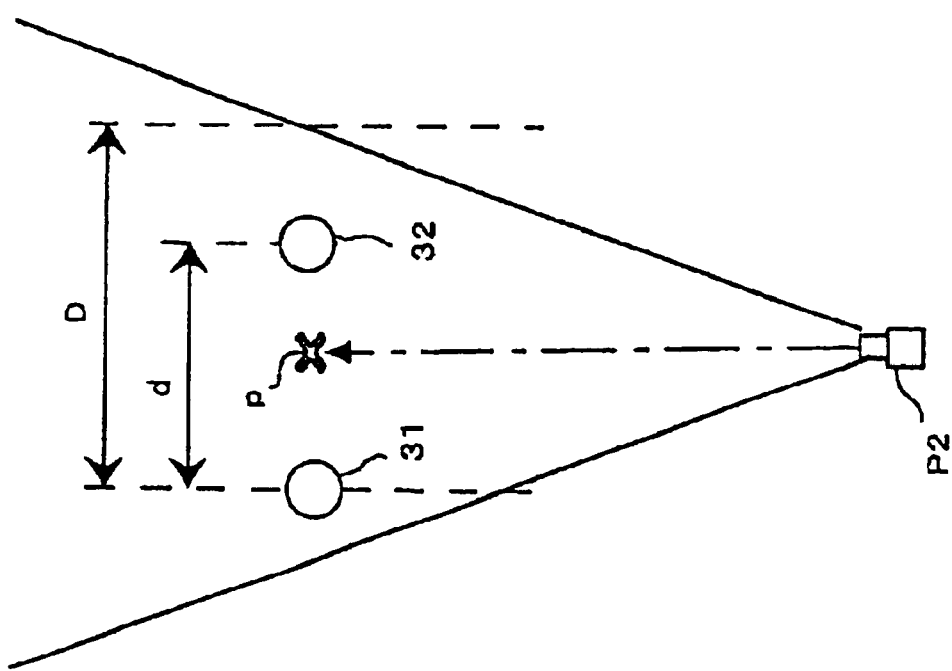
FIG. 5 shows the game picture in FIG. 4 viewed from upper side, a reproduction of visual field picture viewed from the second view point position.

Next, the second view point position P2 settled in the game picture 30 in FIG. 4 will be explained. FIG. 5 is a diagram of game picture 30 in FIG. 4 viewed from upper position and illustrates a visual field image by the second view point position P2 corresponding to the case of the first view point position P1 in FIG. 2. Still, a state where the second view point position P2 is set at just side of each battling character, for the convenience of explanation in FIG. 5.

In FIG. 5, the second view point position P2 is set at comparatively near position aside of the player's own character 31 and the opponent character 32 facing each other in battling. Further as understood by FIG. 4, the altitude of the second view point position P2 is set at the high position where the player's own character 31 and the opponent character 32 can be looked down from the upper side. Still, actually, it is possible to freely change the altitude of the second view point position P2 in accordance with the state of the battle and the view point position P2 may be moved horizontally.

In FIG. 5, the visual field viewed from the second view point position P2 faces the observation point p set at the middle point between the player's own character 31 and the opponent character 32. Still, the visual field is determined corresponding to the visual field range viewed from the second view point position P2 and the visual field angle of which center is set at the observation point p. Basically, the observation point p is set in accordance with the movement of the player's own character 31 and the opponent character 32 and then, the second view point position P2 moves corresponding to the above movement. Still, as explained later, the control operation may be performed so that the distance between the second view point position P2 and the observation point p is changed in accordance with the state of the battle.

The condition to set the virtual camera at the second view point position P2 is determined as described above based on the distance between the player's own character 31 and the opponent character 32. In such a case, the virtual camera is set at the second view point position P2 when the distance between the player's own character 31 and the opponent character 32 d becomes smaller than a predetermined value D in a opposite manner of the case for the first view point position P1. Thus, the visibility of the battle state in the game screen 30 between the player's own character 31 and the opponent character can be enhanced by displaying an image viewed from the second view point position P2 on the game screen 30.

Figure 6:
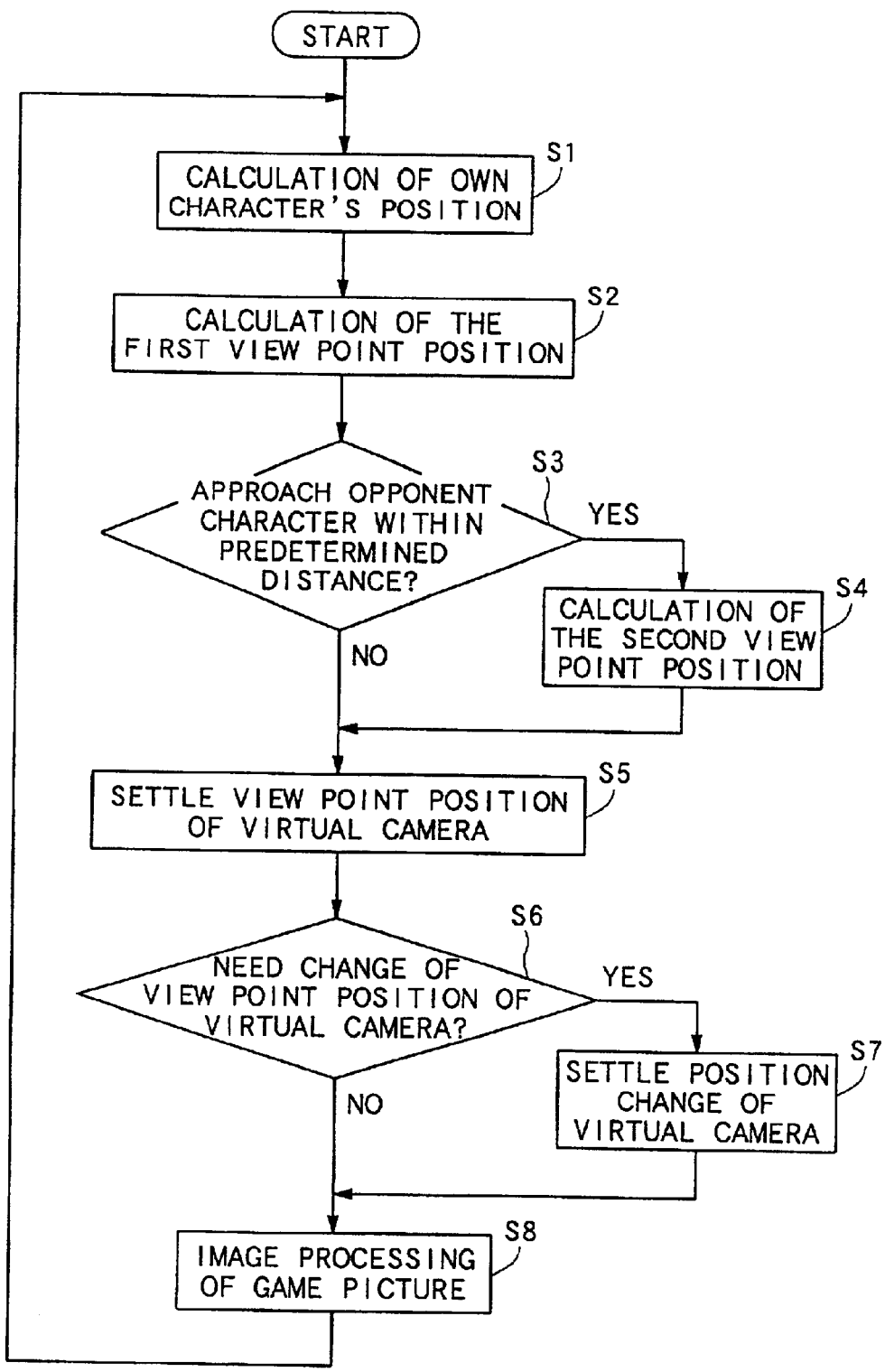
FIG. 6 is a flow chart showing displaying process during the game in the game system according to one embodiment of the invention.
Figure 7:
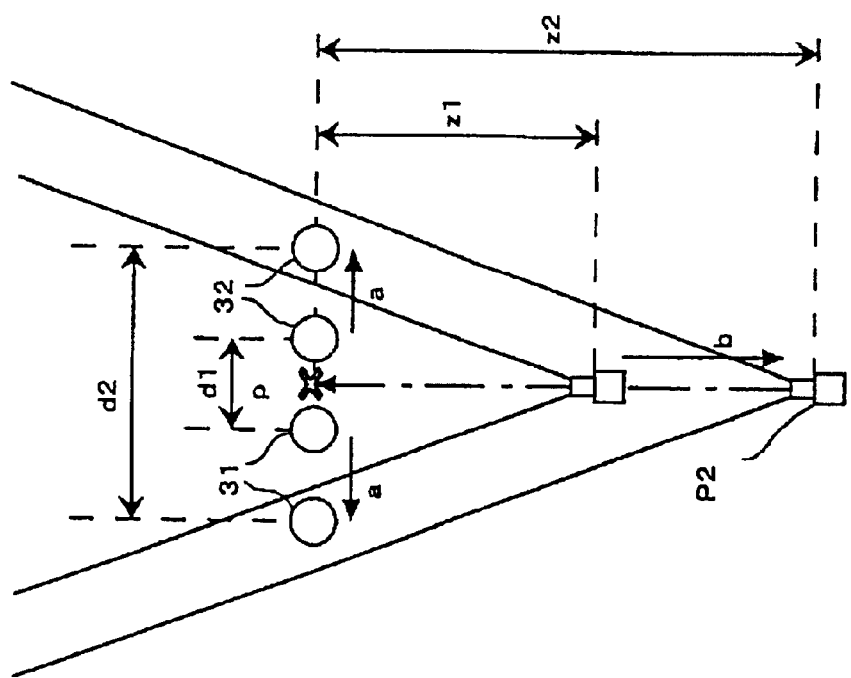
FIG. 7 is a diagram showing a method for adjusting the distance between the second view point position and the observation.
Figure 8:
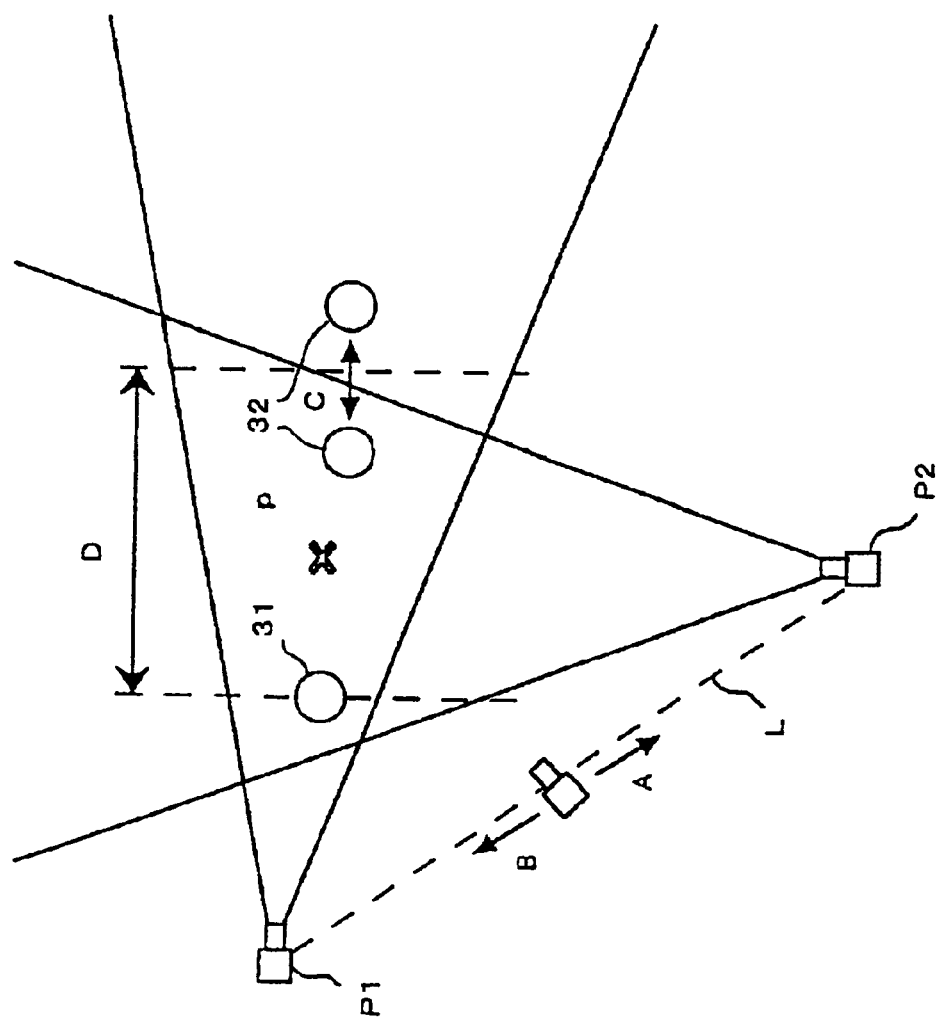
FIG. 8 is a rough sketch showing a method for moving the camera along the virtual line connecting the first view point position with the second view point position.

Next, the method for setting virtual camera corresponding to the first view point position. P1 or the second view point position P2 will be explained by referring to FIGS. 6 to 8. FIG. 6 is a flow chart showing the displaying process during the game in this embodiment of the game system, and FIGS. 7 and 8 are the supplemental chart for FIG. 6.

FIG. 6 shows a processing executed in the state where the player's own character 31 is operated for moving by the controller 15 and battles with the opponent character 32. Firstly, the position of the player's own character 31 in the game field is calculated (step S1). The position of the player's own character 31 is decided corresponding to a moving operation operated by the controller 15. Then, the first view point position is calculated by the co-relation with the calculated position of the player's own character 31 (step S2). In step S2, coordinates for the observation point p settled in the direction for the first view point position P1 and the visual field are calculated.

Next, the position of the player's own character 31 and the opponent character 32 is judged and it is also judged whether the distance d between them becomes smaller than the predetermined value D (step S3). If the distance d between the player's own character 31 and the opponent character 32 is smaller than the predetermined value D (step S3; YES), the process proceeds to step S4. If the distance d is larger than the predetermined value D (step S3; NO), the process proceeds to step 5.

In step S4, the position of the second view point position P2 is calculated in accordance with the both position of the player's own character 31 and the opponent character 32. Firstly, coordinates of the observation point settled at middle of the position between the player's own character 31 and the opponent character 32 is decided and the distance between the observation point p and the view point position P2 is adjusted in accordance with the distance between the player's own character 31 and the opponent character 32.

Here, the method for adjusting the distance between the second view point position P2 and the observation point p will be explained by referring to FIG. 7. In FIG. 7, if the distance between the battling own character 31 and the opponent character 32 is d1, it is assumed that the distance between the observation point p and the view point position P2 is settled at a value z1. It is understood that the player's own character 31 and the opponent character 32 are included in the visual field image viewed from this distance z1. If the player's own character 31 and the opponent character 32 move along an arrow at each other and have a distance d2 at this point, then they go out of the visual field image. Accordingly, the view point position P2 is moved backward along an arrow b so that the distance changes from z1 to z2. Then, it is understood that the player's own character 31 and the opponent character 32 being apart in distance d2 are arranged so as to be included in the visual field image. Thus, it is realized that the reality of the battle scene between the player's own character 31 and the opponent character 32 is enhanced while both of them are displayed so that they never go out of the game picture 30 by adjusting the distance from the observation point p to the view point position P2.

Next in step S5, the virtual camera position is set corresponding to the displayed image of game picture 30 based on the processing result of steps S1 to S4. Namely, if a negative result is given by the judgement in step S3, the virtual camera position is set at the first view point position P1. On the other hand, the judgement result in step S3 is affirmative one, the virtual camera position is set at the second view point position P2.

Further, it is judged whether the arrangement of view point position for the virtual camera is changed or not (step S6). If it is required to change the view point position of the virtual camera (step S6; YES), the movement setting of the virtual camera is performed (step S7). If it is not required to change the view point position of the virtual camera (step S6; NO), the process directly proceeds to step S8 without proceeding to step S7.

Here, the movement setting of the virtual camera in step S7 will be explained. Firstly, in steps S5 to S7, there are three cases performed for the virtual camera as described below. Namely, the first one is (a) setting virtual camera at the first view point position P1, the second one is (b) setting virtual camera at the second view point position P2, and the third one is (c) moving the virtual camera along the line connecting the first view point position P1 to the second view point position P2.

In the above three cases, the case where the distance between the player's own character 31 and the opponent character 32 is kept more than a predetermined value D corresponds to the case (a). The case where the distance between the player's own character 31 and the opponent character 32 is kept within a predetermined value D corresponds to the case (b). The case (a) and the case (b) correspond to the case where the judgement in step S6 is negative one. The case (a) corresponds to the arrangements shown in FIGS. 2 and 3, while the case (b) corresponds to the arrangements shown in FIGS. 4 and 5.

On the other hand, the case (c) corresponds to step S7 where the judgement in step S6 is affirmative. Here, the process in step S7 corresponding to the case (c) will be explained by referring to FIG. 8. FIG. 8 illustrates the method to move the virtual camera along the virtual line connecting the first view point position P1 and the second view point position P2, wherein the first view point position P1 shown in FIG. 3 is superimposed on the second view point position P2 shown in FIG. 5. In this case (c), a virtual line connecting the first view point position P1 to the second view point position P2 is set as a path for the view point position change of the virtual camera in accordance with a distance between the player's own character 31 and the opponent character 32. Still, it will be assumed in the following explanation that the virtual line is a straight one, however, the virtual line may be a curved line.

In FIG. 8, it is assumed that the virtual camera is in a state where it is set at the view point position P1 and the condition of step S3 is not satisfied (d>D). At this point of time, if the player's own character 31 approaches the opponent character 32 and the condition of step S3 is satisfied (d<D), the virtual camera starts moving and moves on the virtual line L along an arrow A to the view point position P2. Still, the visual field image is kept to face the observation point p even during the virtual camera is moving.

On the other hand, in FIG. 8, it is assumed that the virtual camera is in a state where it is set at the view point position P2 and the condition of step S3 is satisfied (d<D). At this point of time, if the condition of step S3 is not satisfied and the player's own character 31 leaves the opponent character 32 far beyond (d>D), the virtual camera starts moving and moves in the opposite direction on the virtual line L along the arrow B toward the view point position P1.

Here, the moving speed of the virtual camera on the virtual line L can be settled as required. For example, in the case where the virtual camera moves along the arrow A, if the distance between the player's own character 31 and the opponent character 32 is rapidly shortened, the virtual camera had better be moved quickly to follow it, while if the distance between the player's own character 31 and the opponent character 32 is slowly changed, the virtual camera had better be moved slowly.

Thus, it is avoided that the player watching the game picture feels uncomfortable as a result of rapid change of the view point or that the visibility turns for worse by smoothly moving the virtual camera along the virtual line L and not by switching the virtual camera position instantly from the first view point position P1 to the second view point position P2.

Backing to FIG. 6, in step S8, an image processing is performed by generating image data in accordance with the processing result in step S7 at image processing portion 17 and outputting the picture on the monitor 19 is performed. In the generated image data, objects such as the player's own character 31 and the opponent character 32 are arranged by converting the coordinates as viewed from the view point position where the virtual camera is arranged. If the processing of step S8 is finished, the process returns to step S1 and the processing of step S1 to S8 is repeatedly performed during the game proceeds.

In the above mentioned embodiment, the shooting game in which the player's own character 31 and the opponent character 32 fight each other was explained, however this invention is not limited to this embodiment and is applicable to another type of the game. Further, a game system which embodies this invention can use a business use game machine, home use game machine, or on-line game system via internet and the like. Still, as the storage medium storing the game program which makes this invention function, CD-ROM, floppy disc, hard disc and other storage medium can be used in addition to DVD-ROM.

As explained above, according to this invention, a game system capable of displaying a game picture by means of which a player feels presence and does not feel uncomfortable can be provided by setting a plurality of view points on the game field in the virtual three-dimensional space, switching selectively the view point position of the visual field viewing the object, and displaying the visual field image during the movement between different view point positions.

What is claimed is:

1. A game system in which an object is arranged in a virtual three-dimensional space, comprising:
    a display device for displaying a game screen;
    an input device for outputting signals according to operations by a player; and
    a game control device for executing a game according to a predetermined program while checking the output of the input device and displaying a visual field image including said object moving to a moving direction on the game screen through the display device, the visual field image being viewed from a view point position in the virtual three-dimensional space,
    wherein the game control device comprises:
        a position determining device for determining a view point position between a first view point position which is a back and slightly inclined position toward the moving don of said object to view an observation point set forward of said object moving to the moving direction, and a second view point position 0 a side of said object relative to the moving direction and from which the observation point is viewed fixed regardless of the movement of said object in accordance with a state of said object; and
        a switch control device for switching between the first view point position and the second viewpoint position when said object reaches a predetermined position, the switch control device being arranged to move between the first and second view point positions on a line between them when they are switched, and while switching been the first and second view point positions, displaying the view field image from moving view point positions on the line between the first and second view point positions.

2. A game system according to claim 1, wherein the position determining device is arranged to situate the second view point position aslant and to the side of said object such that the side of said object is viewed on the game screen.

3. A game system displaying an image on the game screen captured by a virtual camera from a predetermined view point position to an object moving in a virtual three-dimensional space in accordance with a player's operation, wherein the game system comprises:
    a view point position setting device for setting a first view point position which is a back and slightly inclined position toward a moving direction of sad object to view an observation point set forward of said object moving to the moving direction and a second view point position relative to the moving direction and from which the observation point is viewed fixed regardless of the movement of said object in accordance with a state of said object; and
    a virtual camera setting device for arranging said virtual camera by switching alternatively said first view point position to said second view point position corresponding to a state of said object and for moving said virtual camera along a virtual line connecting said first viewpoint position with said second view point position while keeping a state of capturing said object when the view point position is switched.

4. A computer readable recording medium recording a program for allowing a computer, included in a game system in which an object is arranged in a viral three-dimensional space, to function as the following:

a display device for displaying a game screen;

an input device for outputting signals according to operations by a player; and a game control device for executing a game according to the program while checking the output of the input device and displaying a visual field image including said object moving in a moving direction on the game screen through the display device, the visual field image being viewed from a view point position in the virtual three-dimensional space, wherein the game control device comprises:

a position determining device for determining one view point position between a first view point position which is a back and slightly inclined position toward the moving direction of said object to view an observation point set forward of said object moving to the moving direction, and a second view point position on a side of said object relative to the moving direction and from which the observation point is viewed fixed regardless of the movement of said object in accordance with a state of said object; and a switch control device for switching between the first view point position and the second viewpoint position when said object reaches a predetermined position, the switch control device being arranged to move between the first and second view point positions on a line between them when they are switched, and while switching between the first and second view point positions, displaying the view field image from moving view point positions on the line between the first and second view point positions.

5. A computer readable recording medium according to claim 4, wherein the position determining device is arranged to situate the second view point position aslant to the side of said object such that the side of said object is viewed on the game screen.

6. A computer readable storage medium including a program for allowing a computer constituting a game system, the game system displaying a picture captured by a virtual camera from a predetermined view point position to an object moving in accordance with a players operation in a virtual three-dimensional space, to function as:

a view point position setting device for setting a first view point position to which is a back and slightly inclined position toward a moving direction of said object to view an observation point set forward of said object moving to the moving direction and a second view point position on aside of said object relative to the moving direction and from which the observation point is viewed fixed regardless of the movement of said object in accordance wit a state of said object; and a virtual camera setting device for arranging said virtual camera by switching said fit view point position alternatively to said second view point position corresponding to a state of said object, and for moving said vital camera along a virtual line connecting said first view point position to said second view point position while keeping a state of capturing said object when the view point position is switched.

7. An image display method for a game system in which an object is arranged in a virtual three-dimensional space, the game system including a display device for displaying a game screen, an input device for outputting signals according to operations by a player, and a game control device for executing a game according to the program while checking the output of the input device and displaying a visual field image including said object moving to a moving direction on the game screen through the display device, the visual field image being viewed from a view point position in the virtual three-dimensional space, the method comprising the steps of:

determining one view point position between a first view point position which is a back and slightly inclined position toward the moving direction of said object to view an observation point set forward of said object moving to the moving direction, and a second view point position on a side of said object relative to the moving direction and from which an observation point is viewed fixed regardless of the movement of said object in accordance with state of said object; and switching between the first view point position and the second view point position when said object reaches a predetermined position by moving between the first and second view point positions on a line between them and while switching between the first and second view point positions, displaying the view field image from moving viewpoint positions on the line between the first and second viewpoint positions.

8. A method according to claim 7, further comprising the step of determining the second viewpoint position as a position aslant and to the side of said object such that the side of said object is viewed on the game screen.

9. An image displaying method displaying a visual field image viewed from a predetermined view point position by a virtual camera toward an object moving in accordance with a player's operation in a virtual three-dimensional space, comprising;

a view point position setting device for setting a first view point position for which is a back and slightly inclined position toward a moving direction of said object to view an observation point set forward of said object moving to the moving direction, and a second view point position on a side of said object relative to the moving direction and from which the observation point is viewed fixed regardless of the movement of said object in accordance with a state of said object; and a virtual camera setting device for arranging said virtual camera by alternatively switching said first view point position to said second view point position in accordance with a state of said object, and moving said virtual camera along a line connecting said first view point position with said second view point position while keeping a state of capturing said operas object when the view point position is switched.

* * * * *